Figure 1:
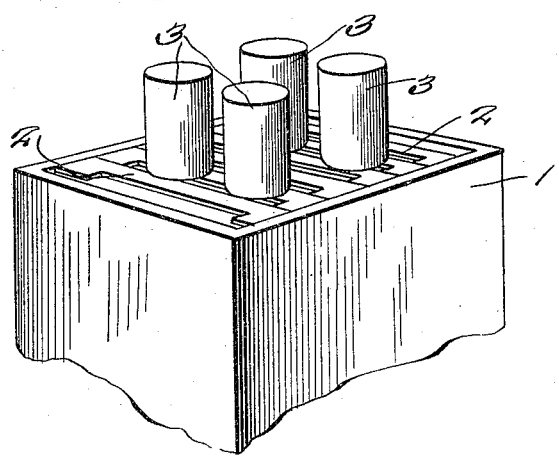

H. H. THALE.
BEE CULTURE APPARATUS.
APPLICATION FILED MAY 9, 1912.

1,046,507.

Patented Dec. 10, 1912.

Witnesses
Francis C. Boswell
C. E. Clements

Inventor
H. H. Thale
By D. Swift & Co.
Attorneys

COLUMBIA PLANOGRAPH CO., WASHINGTON, D. C.

UNITED STATES PATENT OFFICE.

HARRY H. THALE, OF LEWISTON, MISSOURI.

BEE-CULTURE APPARATUS.

1,046,507.  Specification of Letters Patent.  Patented Dec. 10, 1912.

Application filed May 9, 1912. Serial No. 696,133.

*To all whom it may concern:*

Be it known that I, HARRY H. THALE, a citizen of the United States, residing at Lewiston, in the county of Lewis and State of Missouri, have invented a new and useful Bee-Culture Apparatus; and I do hereby declare the following to be a full, clear, and exact description of the invention, such as will enable others skilled in the art to which it appertains to make and use the same.

This invention relates to the art of bee culture, and it more particularly relates to a new and useful feeder for a bee hive.

It is the object of this invention to provide a feeder, that may be adjusted in such wise as to regulate the feed as desired, say for instance a half pint, or quart, or half gallon, or all the feed in twenty-four hours, or in any other desired length of time.

The invention comprises further features and combination of parts, as hereinafter set forth, shown in the drawings and claimed.

Figure 2:
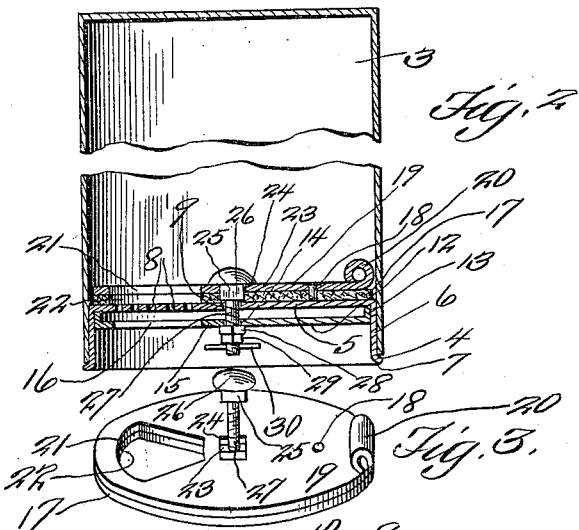
Figure 4:
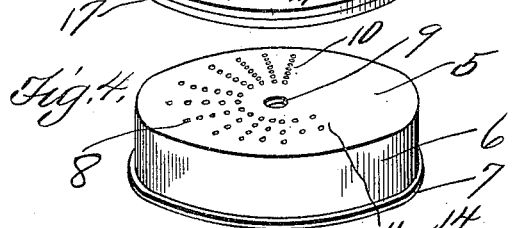
Figure 5:
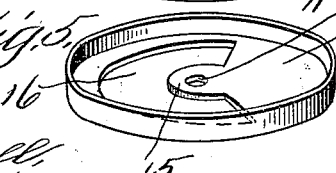

In the drawings:—Figure 1 is a fragmentary view in perspective of a portion of a bee hive, showing a plurality of the feeders as applied. Fig. 2 is a sectional view through one of the feeders shown in Fig. 1. Fig. 3 is a detail perspective view of the disks 19 and 17. Fig. 4 is a detail perspective view of the disk 5 showing the flange 6. Fig. 5 is a detail perspective view of the disk 12 with its flange 13.

Referring to the drawings 1 designates a portion of a bee hive, while 2 denotes the comb frames, there being only the upper portions of the frames shown, and which may be of any desired construction.

Arranged on top of the comb frames is a plurality of feeders 3. Each feeder is in the form of a cylindrical receptacle, with its open end 4 inverted. Extending into the open end 4 and held in the receptacle 3 by friction is a disk 5 having an annular flange 6, which flange 6 terminates in a supplemental peripheral flange 7, which engages the annular periphery of the open end 4, in order to prevent the disk 5 from being inserted too far into the feeder receptacle, as shown clearly in Fig. 2. The disk 5 is provided with a series of perforations 8, which are arranged substantially semi-annularly about the center opening 9 of the disk 5. The perforations 8 diminish in number from the point 10 to the point 11. Arranged upon the under surface of the disk 5 within the annular flange 6 is a disk 12 having an annular flange 13 and a central opening 14. The opening 14 is in the semi-annular lug or projection 15, about which the semi-annular opening 16 extends. This opening 16 conforms to the semi-annular contour of the arrangement of the perforations 8 as will be seen upon the examination of Figs. 4 and 5. Arranged adjacent the upper face of the disk 5 is a leather or other fiber disk 17, which is secured by adhesive material and a rivet 18 to the disk 19, which is provided at one side with a roll 20 constituting a hand piece, and opposite which is an opening 21, which is substantially segmental, and about a third of the opening 16. This opening 21 permanently registers with a corresponding opening 22 in the leather disk. The leather disk 17 and the disk 18 are provided with registered rectangular openings 23 and 24, which receive the rectangular portion 25 of the pin or bolt 26, so as to turn with the bolt. The threaded portion 27 of the bolt beyond the rectangular portion 25 extends through the openings 9 and 14 of the disks 5 and 12, and upon its lower portion the nuts 28 and 29 are threaded, the nut 29 constituting a lock nut. By the provision of the pin or bolt and the nuts 28 and 29 the several disks are held in their proper relations. Extending transversely of the threaded portion 27 of the pin or bolt is a pin 30, by which the bolt may be turned, and when turned the disks 17 and 18 are adjusted, so that the openings 21 and 22 will register or uncover several or a series of the larger or smaller number of perforations 8, so that the feed or syrup in the feed receptacle may be allowed to pass through the perforations. The disk 12 with its flange 13 not only acts to brace the disk 5 with its flange 6, but also constitutes yieldable means, between the nut 28 and the head of the pin or bolt, so that the disks 17 and 18 may be readily rotated, however, the leather disk 17 acts to insure friction between it and the disk 5, in order to hold the disk 18 in adjusted positions. This friction may be increased or decreased, by the adjustment of the nuts 28 and 29.

From the foregoing it will be noted there has been devised a novel and efficient feeder for bee hives, and one which has been found desirable and practical.

The invention having been set forth, what is claimed as new and useful is:—

1. A feeder for a bee hive comprising an inverted receptacle, a flange disk secured frictionally in the receptacle and provided with an annular arrangement of perforations, a second disk having friction means and provided with an opening adapted to uncover the perforations arranged on one side of the first disk, and means for yieldably holding the second disk with its friction means in contact with the first disk.

2. A feeder for a bee hive comprising a receptacle, a disk arranged on one end of the receptacle and provided with a series of perforations, a second disk having an opening adapted when the second disk is rotated to uncover several or more perforations, and means for holding the second disk yieldably and frictionally in contact with the first disk.

3. A feeder for a bee hive comprising a receptacle, a disk arranged on one end of the receptacle and provided with a series of perforations, a second disk having an opening adapted when the second disk is rotated to uncover several or more perforations, and means for holding the second disk yieldably and frictionally in contact with the first disk, said means including means whereby the second disk may be rotated.

4. A feeder for a bee hive comprising a receptacle having an open end, a disk having a main flange terminating in a supplemental laterally extending flange and secured by friction in the open end with the supplemental flange in contact with the periphery of the receptacle, the disk having a series of perforations, a second disk having a friction disk arranged on one side of the first disk, the second disk and the friction disk having openings in registration adapted when the second disk and the friction disk are rotated together to uncover several or more of the perforations of the first disk, a third disk spaced apart from the first disk and arranged on the other side thereof and provided with an opening corresponding to the contour of the arrangement of the perforations, means for holding the second disk and its friction disk frictionally against the first disk, the means including devices whereby the friction may be increased or decreased, the third disk constituting means for yieldably holding friction disk in contact with the first disk, the first means having a device whereby the second disk may be rotated.

In testimony whereof I have signed my name to this specification in the presence of two subscribing witnesses.

HARRY H. THALE.

Witnesses:
JOHN S. NEWLON,
ROY W. ROBERTS.

---

Copies of this patent may be obtained for five cents each, by addressing the "Commissioner of Patents, Washington, D. C."